(12) United States Patent
Lundberg et al.

(10) Patent No.: US 7,145,883 B2
(45) Date of Patent: Dec. 5, 2006

(54) SYSTEM AND METHOD FOR GAIN CONTROL OF AUDIO SAMPLE PACKETS

(75) Inventors: Keith M Lundberg, Cambridge, MA (US); Paul W Reilly, Arlington, MA (US)

(73) Assignee: Sonexis, Inc., Boston, MA (US)

( * ) Notice: Subject to any disclaimer, the term of this patent is extended or adjusted under 35 U.S.C. 154(b) by 1079 days.

(21) Appl. No.: 10/218,940

(22) Filed: Aug. 14, 2002

(65) Prior Publication Data

US 2003/0161276 A1 Aug. 28, 2003

Related U.S. Application Data

(60) Provisional application No. 60/359,364, filed on Feb. 25, 2002.

(51) Int. Cl.
*H04L 12/16* (2006.01)
*H04L 12/28* (2006.01)
(52) U.S. Cl. .................. 370/260; 370/254; 379/202.01
(58) Field of Classification Search ..................... None
See application file for complete search history.

(56) References Cited

U.S. PATENT DOCUMENTS

| | | | |
|---|---|---|---|
| 5,737,407 A * | 4/1998 | Graumann ............. | 379/388.04 |
| 5,764,916 A | 6/1998 | Busey et al. ........... | 395/200.57 |
| 5,818,836 A | 10/1998 | DuVal .......................... | 370/389 |
| 5,862,330 A | 1/1999 | Anupam et al. ....... | 395/200.34 |
| 5,884,032 A | 3/1999 | Bateman et al. ....... | 395/200.34 |
| 5,916,302 A | 6/1999 | Dunn et al. .................. | 709/204 |
| 5,963,217 A | 10/1999 | Grayson et al. ............. | 345/473 |
| 5,974,446 A | 10/1999 | Sonnenreich et al. ....... | 709/204 |
| 5,991,277 A * | 11/1999 | Maeng et al. ................ | 370/263 |
| 6,108,687 A | 8/2000 | Craig .......................... | 709/203 |
| 6,138,144 A | 10/2000 | DeSimone et al. ......... | 709/204 |
| 6,148,068 A | 11/2000 | Lowery et al. ........ | 379/202.01 |
| 6,167,432 A | 12/2000 | Jiang ........................... | 709/204 |
| 6,173,314 B1 | 1/2001 | Kurashima et al. ......... | 709/204 |
| 6,266,328 B1 | 7/2001 | Johnson, Jr. et al. ....... | 370/260 |

OTHER PUBLICATIONS

U.S. Appl. No. 60/359,364, filed Feb. 26, 2002, by Flowers et al.
U.S. Appl. No. 10/218,819, filed Aug. 14, 2002, by Flowers et al.
U.S. Appl. No. 10/218,761, filed Aug. 14, 2002, by Flowers et al.

* cited by examiner

*Primary Examiner*—Duc Ho
(74) *Attorney, Agent, or Firm*—Burns & Levinson LLP; Jerry Cohen; David W. Gomes

(57) ABSTRACT

Determining gain factors for a sequential multiplicity of audio sample packets by first determining a comparison peak value for a present such packet by multiplying a highest sample value by a previously predetermined gain factor, determining a hysteretic peak value for the present peak from the comparison peak value and a hysteretic peak value from a previously processed packet and determining a gain factor for use with subsequent packets.

20 Claims, 3 Drawing Sheets

SYSTEM AND METHOD FOR GAIN CONTROL OF AUDIO SAMPLE PACKETS

RELATED APPLICATIONS

The present application claims priority from U.S. provisional patent application Ser. No. 60/359,364, filed Feb. 25, 2002, entitled Telephone Conferencing System, Software And Method.

FIELD OF THE INVENTION

The present invention generally relates to telephone conferencing systems and particularly to the processing of audio sample packets used in the system.

BACKGROUND

Telephone conferencing is widely used in business to enable groups of diversely disciplined individuals to have meaningful interactive discussions, which provide understanding of inter-related issues and thereby achieve progress on complex projects without the expense, time and inconvenience of travel. Most teleconferencing systems developed to date have used audio mixing techniques which are hardware based and thereby do not provide the greater sophistication available with software based systems. Such hardware based systems typically mix all incoming audio signals which can at times provide listeners with a confusing cacophony. Signal levels between the various conference connections can be normalized to compensate for audio volume variations between participants; however, significant sophistication for controlling the contents of the resulting audio output can still be lacking. Managing teleconferences using such technology is still very dependent upon the etiquette observed by the participants. Such hardware based mixing systems are also typically costly to install and maintain, making them useable only by telephone service providers and available to business users only as a subscription service.

It is desirable in teleconferencing systems to have greater sophistication in various aspects of each teleconference and particularly in the audio mixing aspect. An important part of such systems is the audio gain function for normalizing volume levels from diverse participating connections. It is also desirable to have a software based teleconferencing system which is more affordable to business users.

SUMMARY OF THE INVENTION

It is an object of the present invention to provide a digital processing, gain control system useable for teleconferencing systems.

It is a further object of the present invention to provide such a gain control system, which is compatible with software based processing of teleconferencing audio signals.

It is a still further object of the present invention to provide such a gain control system which can function with sufficient speed to meet the requirements for very interactive teleconferences between many participants.

Accordingly, a processor or system for determining gain factors for a sequential multiplicity of audio sample packets based upon sequentially processing each packet as a present packet, determines a comparison peak value for the present packet by multiplying a highest sample value from the present packet by a previously determined gain factor, determines a present packet hysteretic peak value from the comparison peak value and a hysteretic peak from a previously processed packet, and determines a new gain factor, for use with one or more subsequently processed packets, by periodically comparing the present packet hysteretic peak value against predetermined minimum and maximum range values. Determining a present packet hysteretic peak value can include adding a fraction of the comparison peak value to a complementary fraction of the hysteretic peak value determined for a last-processed sequential packet. The process of determining a new gain factor may be performed once for every predetermined number of packets. Determining a new gain factor may include detecting for the presence of silence by comparing the hysteretic peak value against a silence threshold value. In one form, determining a new gain factor also includes using the previously determined gain factor as the new gain factor if the compared hysteretic peak value is between the predetermined minimum and maximum range values or below the silence threshold value, and adjusting the previously determined gain factor if the compared hysteretic peak value is neither between the predetermined minimum and maximum range values nor below the silence threshold value. Further, the present packet hysteretic peak value can be adjusted in response to adjusting the previously determined gain factor for causing the present packet hysteretic peak value to be based upon the new gain factor.

Optionally, the presence of clipping may be detected from the comparison peak value; and the new gain factor may be determined in response to the presence of clipping by lowering the previously determined gain factor by a predetermined amount.

BRIEF DESCRIPTION OF THE DRAWINGS

The present invention is illustratively described and shown in reference to the accompanying drawings, in which.

DETAILED DESCRIPTION OF THE DRAWINGS

Figure 1:
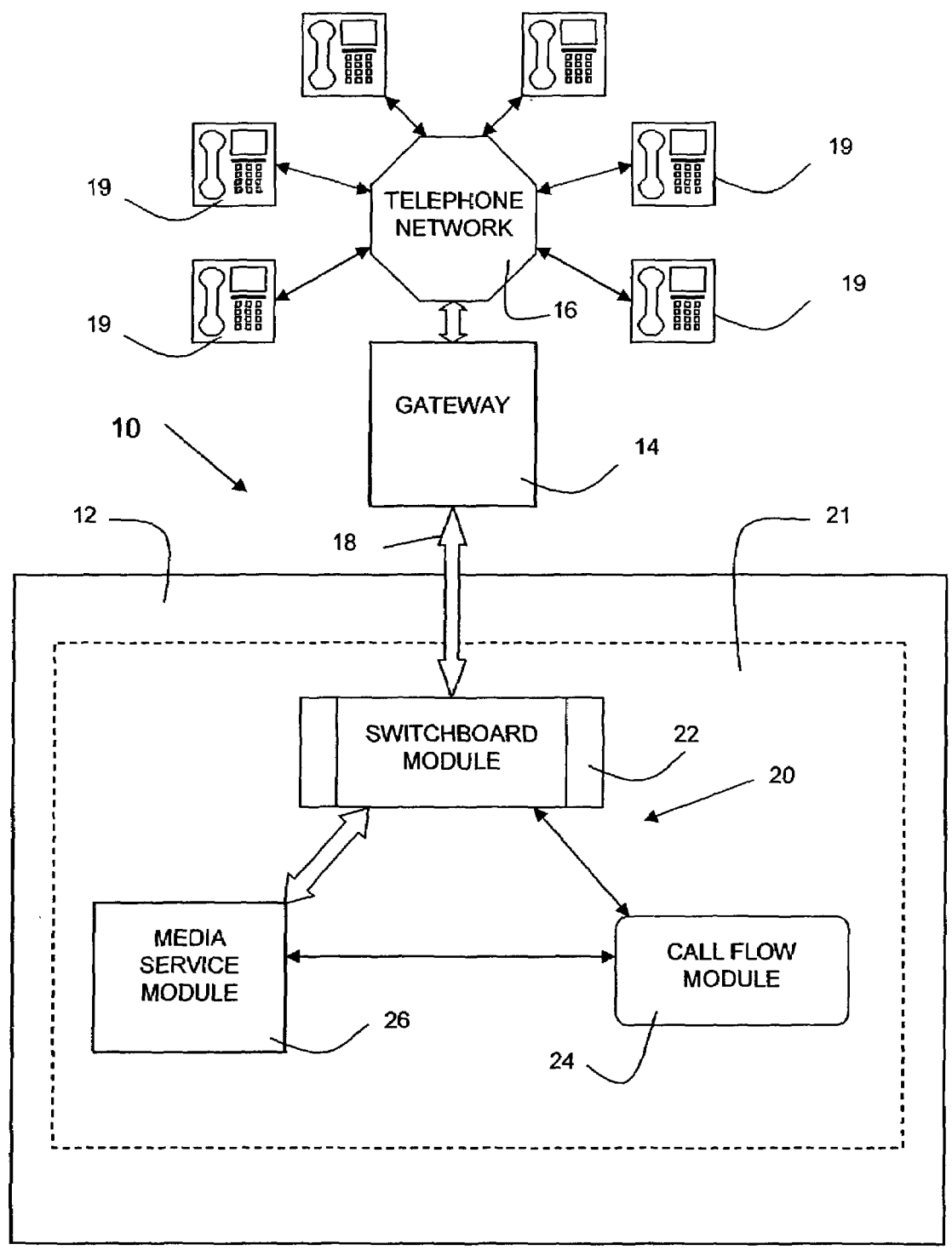
FIG. 1 is a system block diagram of a software based teleconferencing system.

The present invention for audio gain control is described in the context of a software based, telephone conferencing system which digitally receives, processes, mixes and outputs, packets of audio sample values. Although the embodiment described is particularly suitable for use with the audio sample packets used in digital telephony systems, it may also be applied to any similar applications. A teleconferencing system 10 is generally shown in FIG. 1 in its simplest form and includes a computer 12 with a telephone interface or gateway card 14 to which a PSTN or other common telephony network 16 is connected. The gateway card 14 converts common telephony signaling protocols such as ISDN/PRI and CAS into common computer format, and converts common telephony audio sample packets sent via time division multiplexing, or TDM, into audio packets that can be carried over a common computer network 18.

Computer 12 includes software 20 stored in memory 21 or any other suitable, computer readable media, which software 20 has three software modules, Switchboard module 22, Call Flow module 24, and Media Service module 26. These modules are developed for the Distributed Component Object Model, DCOM, a method for Inter-Process Communication (IPC) which runs on a Microsoft Windows operating system. In this manner, the modules may easily be run on either a single processor, separate processors or computers, or some combination there between. Interconnection between multiple computers, for the implementation of this system 10, may be accomplished with the use of a common IP switch, by methods well known in the art.

The Switchboard module 22 interfaces with the gateway card 14, to direct all signals, which may be either audio packets or a variety of telephony signals, such as an incoming call signal or a DTMF signal. Switchboard 22 directs audio packets to the Media Service module 26 and telephony signals to the Call Flow module 24. In the event that system 10 uses voice responses to control conference functions, such voice responses can be identified by the switchboard module 22 and sent to call flow module 24. Alternatively, audio packets may be routed directly between Media Service module 26 and gateway card 14 for expeditious handling.

The Call Flow module 24 manages all calls, which are defined in terms of connections and conferences, and responds to all telephony signals in the manner described in U.S. patent application entitled Method And System For Providing Audio Conferencing Services, serial No. 09/528, 549 filed Mar. 20, 2000 and corresponding PCT Patent Application No. US01/08082 filed Mar. 14, 2001, which are hereby incorporated by reference herein. Further details of the system 10 and software 20 are also described in co-pending U.S. patent applications entitled SYSTEM AND METHOD FOR PROCESSING DIGITAL AUDIO PACKETS FOR TELEPHONE CONFERENCING by Jeffry C. Flowers and James J. Koschella and TELEPHONE CONFERENCING SYSTEM AND METHOD by Jeffry C. Flowers and James J. Koschella, which are hereby incorporated by reference herein.

Figure 2:
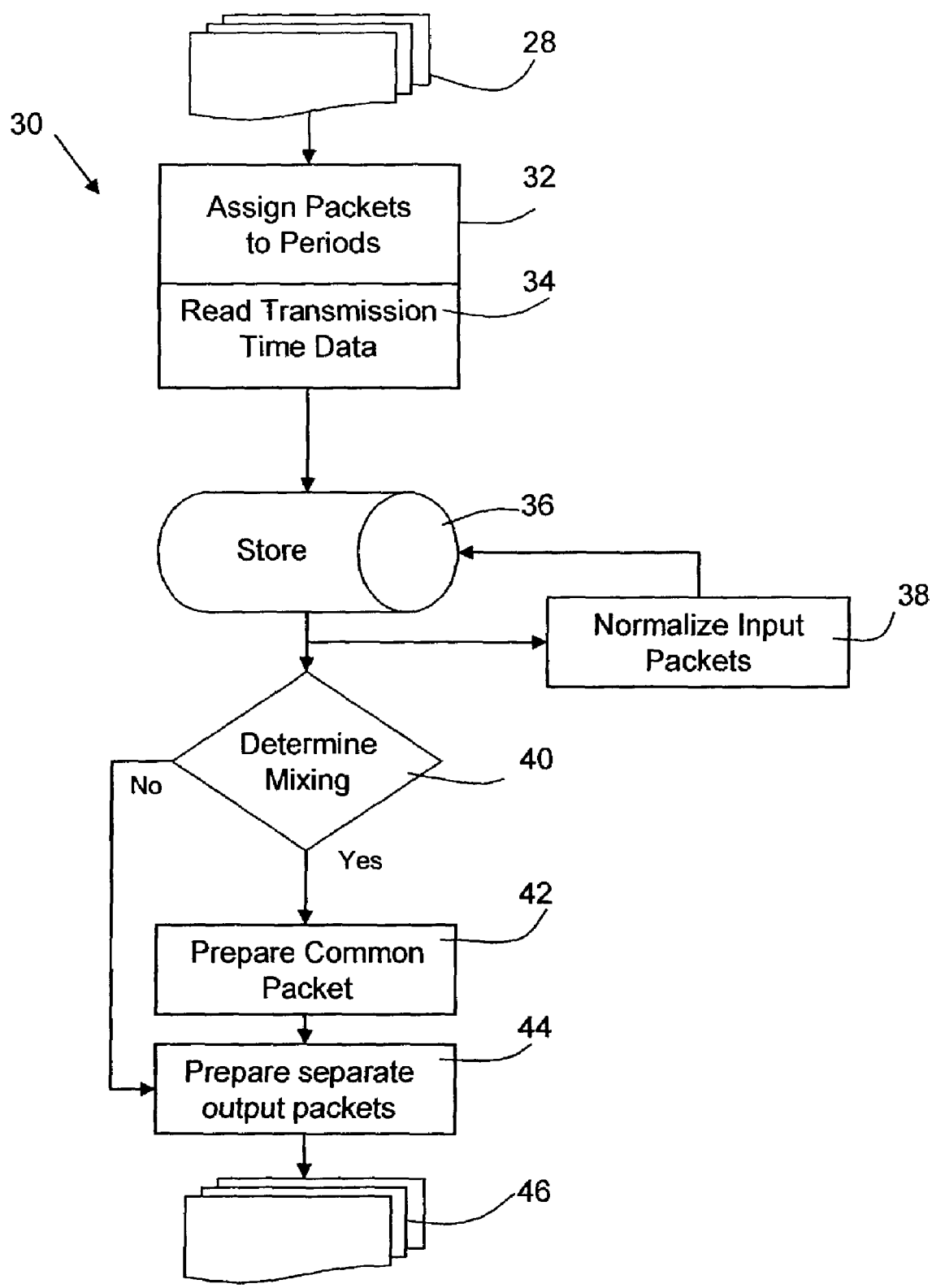
FIG. 2 is a flow diagram of an audio signal processing system suitable for use with the system of FIG. 1.

The Media Service module 26 includes a processing system 30, generally shown n FIG. 2, which receives sequential audio input packets 28, also known as media, from any and all connections 19 and all conferences being handled by teleconferencing system 10. The processing system 30 generally includes an Assigning process 32, a Storing process 36, a Normalizing process 38, a Determining process 40, a first Preparing process 42 for a common packet, and a second Preparing process 44 for connection-specific output packets 46.

Assigning process 32 includes steps for designating a sequence of output periods for sending audio output packets 46 to all connections 19. An included reading process 34 reads any transmission time data, or "time stamp", contained in each of the received audio input packets 28. Assigning process 32 then assigns sequential audio input packets 28 from each connection to corresponding sequential output periods in response to the transmission time data from the reading process 34. In this manner, the input packets assigned to each output period are from different connections.

The input, and output, packet size is determined by the host telephone system and is typically 20 to 30 milliseconds in length. The Media Service module 26 uses the same 20 to 30 millisecond packet size to designate the output periods for sending audio output packets back to the connections. Such input packets 28 are subject to irregular arrival times, or "jitter," due to the nature of packet based telephone networks. A predetermined amount of delay is used between receipt of the audio input packets 28 and transmission of corresponding audio output packets 46, which delay absorbs any telephone system jitter and provides time for processing packets. Assigning process 32 can include marking each of the assigned input packets with their respective output periods. The Media Service module 26 may keep track of all of the connection-specific time stamps and output period assignments for purposes of assuring accurate packet timing and determining the loss of any packets. Lost packets can be compensated for by known techniques such as simply repeating the previous sequential packet. Packets not having a valid time stamp may be treated as damaged or lost packets.

Storing process 36 then saves the packets from each connection in a separate ring buffer, which ring buffers may be large enough to store as many as five or six packets for each connection. Storing process 36 is thus part of the buffering used to compensate for telephone system jitter and provide time for packet processing. It may also be used to help realign input packets that are received out of sequence. The sample values in the packets are stored in the format (compressed or not) in which they are received.

Normalizing process 38 includes steps for adjusting the sample values in each of the input packets to be within a very general common range, thereby providing greater compatibility for relative measurement and mixing. Normalizing process 38 generally compensates both for the various value ranges provided by the different connection-specific telephone systems participating in any conference, as well as for the range of sound levels that can be produced from a single connection. It is within normalizing process 38 that the present invention resides by performing an automated gain control on the individual packets and sample values. This particular system is described in greater detail below in reference to FIG. 3.

The Determining process 40 includes steps for determining the applicability, to each output period, of using a common audio output packet for a plurality of connections. Such applicability may be found whenever a mere plurality, or two or more connections will receive the same common output packet during an output period. Optionally, the minimum number of connections required for applicability of a common output packet may be higher.

The first Preparing process 42 includes steps for preparing a common audio output packet by mixing normalized audio input packets from one or more connections, for each output period where a common audio output packet is applicable.

The second Preparing process 44 includes steps for preparing a separate audio output packet 46 specifically for each connection during each output period including use of a respective common audio output packet where applicable.

The processes of Determining 40, Preparing a common packet 42 and Preparing output packets 44 take advantage of the gain control function of the present invention but are more a part of the teleconferencing system 10 and software 20. Further details of these processes are described in the aforesaid co-pending patent application entitled SYSTEM AND METHOD FOR PROCESSING DIGITAL AUDIO PACKETS FOR TELEPHONE CONFERENCING by Jeffry C. Flowers and James J. Koschella.

Figure 3:
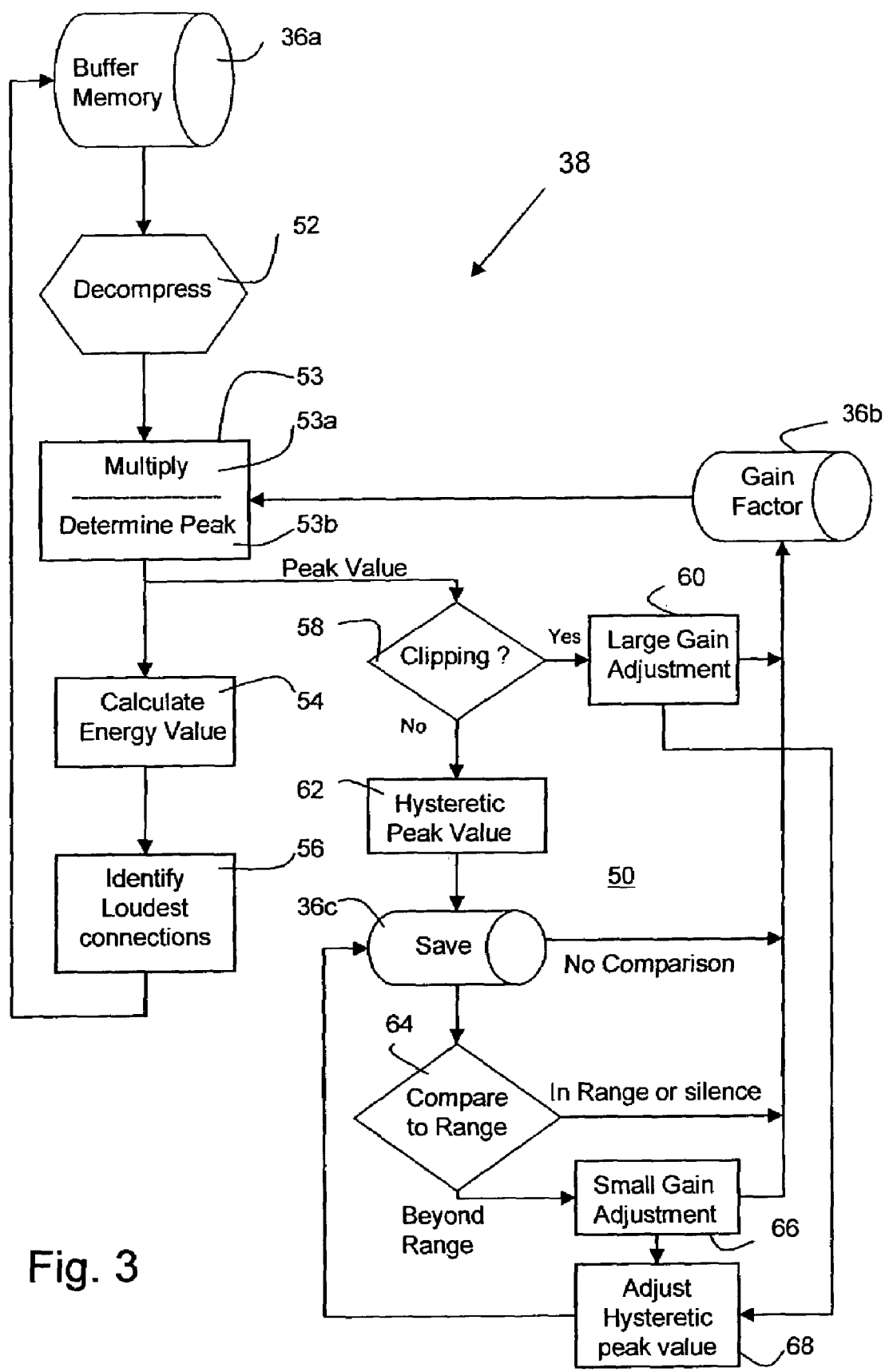
FIG. 3 is a flow diagram of a digital processing system constructed in accordance with one embodiment of the present invention and suitable for use in the audio signal processing system of FIG. 2.

FIG. 3 shows the audio gain control processing system 50 of the present invention in relation to other parts of normalizing step 38. The audio input packets 28 that have been stored by Storing process 36 are first retrieved from a buffer memory 36a. As mentioned, these packets have been stored as received and have not necessarily been decoded. They are therefore decoded by a decompression process 52, as needed. This typically means the G.711 CODEC packets are decompressed to a linear format. In one embodiment, all coding and decoding is performed with a look-up table process.

As mentioned, Normalizing process 38 includes steps for adjusting the sample values in each of the input packets 28 to be within a very general common range. This is done by multiplying process 53 using a saved gain factor from memory 36b. This enables a determination in process 54 of a relative packet "energy" value for each packet. Identification process 56 then uses these relative energy values to identify a predetermined number of "loudest" connections for each designated output period by comparing the determined relative energy values of the input packets assigned to each output period. The normalized audio input packets are then re-stored in buffer memory 36a.

The nature of teleconferencing systems should be keep in mind in that system 10 handles a multiplicity of incoming streams of audio input packets and needs to process, mix and output, audio output packets to all connections with minimal delay in order to provide a useful teleconferencing function. The present gain control function is intended to handle the serial processing of all audio packets at a throughput level which keeps up with large numbers of connections. Although the present invention is described herein in the form of a computer program for a general purpose computer, it may also be embodied in any suitable processing form, in hardware such as an ASIC (application specific integrated circuit), or in programmable hardware such as an FPGA (field programmable gate array).

The present invention is intended to determine gain factors for a sequential multiplicity of audio sample packets based upon sequentially processing each packet as a present packet. Normalizing process 38 includes steps for normalizing all sample values within each audio input packet based upon a highest sample value, or peak value, in each audio input packet from respective connections. The peak value is determined in multiplying process 53 by a processing step 53a for multiplying all sample values within each audio input packet by a previously determined gain factor and by a processing step 53b for determining the highest sample value within each packet. In one embodiment, these steps are performed in the order described, but that order may be reversed. For purposes of the present invention, the steps 53a and 53b thereby determine a comparison peak value in which the highest sample value from the present packet is multiplied by the previously determined gain factor. The comparison peak value is so-called as it is used for comparison purposes later in the process to determine a new gain factor. The previously determined gain factor was set from a previously processed, connection-specific packet and was stored in memory 36b for use with the present packet. A predetermined, low average gain factor is used in the absence of a previously determined connection-specific gain factor The comparison peak value is sent to a first comparison process 58 which determines the presence of clipping by comparing the comparison peak value against a predetermined maximum value. In the presence of clipping, a signal is sent to an adjustment process 60 which lowers the predetermined gain factor, which was used for the present packet, by a substantial, predetermined amount. The new gain factor is then stored in memory 36b for use with subsequently processed, connection-specific input packets. In one embodiment, the gain factor takes the form of a percentage value, wherein normal adjustments are made by single percentage points and major adjustments, as in the presence of clipping, are made at a rate of ten percentage points. When clipping is not present, adjustment process 60 is not used.

A process 62 to determine a present packet hysteretic peak value uses the comparison peak value and a previously determined hysteretic peak value from a previously processed packet. The term "hysteretic" is used herein to describe a value calculated from both the measured present packet and previous packets. The present packet hysteretic peak value is calculated by adding a fraction of the present packet comparison peak value to the complementary fraction of the previous packet hysteretic peak value, the formula for which is:

$$Hys_n = [M_n * \alpha] + [Hys_{n-1} * (1-\alpha)]$$

Where: $Hys_n$ is the hysteretic peak value being calculated for the present packet;
$M_n$ is the comparison peak value for the present packet;
$Hys_{n-1}$ is the calculated hysteretic peak value for the previous, connection-specific packet; and
$\alpha$ is a fractional or percentage value potentially ranging from zero to one.

The $\alpha$ fraction for each calculation may be varied in response to different comparison peak value conditions. If the comparison peak value is higher than the calculated previous packet hysteretic peak value, higher $\alpha$ fraction (i.e. "1.0") can be used to thereby raise the present packet calculated hysteretic value more quickly by including less historic value. This will have the ultimate effect of lowering the gain factor more quickly. When the present packet comparison peak value is lower than the previous packet hysteretic peak value, a much lower $\alpha$ fraction (i.e. "0.005") can be used to include more historic value in the calculated present packet hysteretic peak value. This will have the ultimate effect of raising the gain factor more slowly and thereby preventing sudden loud surges in a person's voice signal. Once calculated, the present packet hysteretic peak value is stored in memory 36c relative to its respective packet and connection.

The present packet hysteretic peak value is used to determine a new gain factor for use with one or more subsequently processed packets by a comparison against predetermined minimum and maximum range values in comparison process 64. Comparison process 64 also compares the present packet hysteretic peak value against a lower silence threshold value to determine the presence of silence. If this present packet hysteretic peak value is either between the predetermined minimum and maximum range values or below the silence threshold value, the new gain factor is set equal to the previously determined gain factor. If the present packet hysteretic peak value is neither below the silence threshold value nor between the minimum and maximum range values, a responsive small gain adjustment is made in process 66.

Comparison process 64 is performed on a periodic basis and typically once for every predetermined number of packets. In one example, with audio packets of 20 milliseconds, comparison process 64 is performed on every fifth sequential audio packet or 10 times per second. Whenever the hysteretic peak value receives no comparison, gain control processing system 50 returns to gain factor memory 36b to leave the gain factor unchanged for the next sequential, connection-specific audio packet, after saving the calculated hysteretic peak value.

The small gain adjustment of process 66 is made in a predetermined amount, such as a single percentage point in the example described above for detected clipping. This small gain adjustment is responsive to the comparing of the present packet hysteretic peak value in that the direction of the adjustment moves the hysteretic peak value towards the range defined by the minimum and maximum values. All new gain factors are stored in memory 36*b*.

In the event of any gain factor adjustment, including Large Gain Adjustment process 60, the present packet hysteretic peak value is correspondingly changed by an adjustment process 68 and the new value is saved in memory 36*c* for use with future, connection-specific packets.

The detection of silence and subsequent use of the previously determined gain factor as the new gain factor insures that the gain factor will not be automatically raised when a conference participant is silent, and thereby result in a loud burst when the participant resumes speaking.

In the manner described above, the present invention determines gain factors for use in processing sequential audio packets for a connection to a telephone conference. This process is also functional when applied to all connections in a conference and also to a telephone conferencing system which handles a large number of separate telephone conferences.

In both of the conference and multi-conference applications, this gain control function is performed on a connection specific basis. More specifically, gain factors are saved and adjusted separately with respect to each connection and only in response to input audio packets from the respective connection. Likewise, the hysteretic peak values are determined and saved with respect to each connection. In this manner, the handling of a large number of connections and multiple conferences in a single teleconferencing system is readily enabled by the present invention while maintaining the integrity of both the gain control and teleconferencing functions.

The specific embodiments of the present invention described above are intended to be taken in an illustrative and not a limiting sense. Various modifications and changes may be made to the above embodiments by practitioners skilled in the art, without departing from the scope of the present invention as defined in the appended claims.

What is claimed is:

1. A method for determining gain factors for a sequential multiplicity of audio sample packets in an audio conferencing system, based upon sequentially processing each packet as a present packet, comprising:

determining a comparison peak value for a present packet by multiplying a highest sample value from said present packet by a previously determined gain factor determined in response to a previously processed packet;

determining a present packet hysteretic peak value from said comparison peak value and a previously determined hysteretic peak value from a previously processed packet; and determining a new gain factor, to be used as the previously determined gain factor with one or more subsequently processed packets, by periodically comparing present packet hysteretic peak values against predetermined minimum and maximum range values.

2. The method of claim 1, wherein said step of determining a present packet hysteretic peak value includes adding a fraction of said comparison peak value to a complementary fraction of the hysteretic peak value determined for a last-processed sequential packet.

3. The method of claim 1, wherein said step of determining a new gain factor is performed once for every predetermined number of packets.

4. The method of claim 1, wherein said step of determining a new gain factor includes detecting for silence by comparing present packet hysteretic peak values against a silence threshold value.

5. The method of claim 4, wherein said step of determining a new gain factor includes using said previously determined gain factor as said new gain factor if the compared hysteretic peak value is between said predetermined minimum and maximum range values or below said silence threshold value, and adjusting said previously determined gain factor in response to said step of comparing to determine said new gain factor, if said compared hysteretic peak value is neither between said predetermined minimum and maximum range values nor below said silence threshold value.

6. The method of claim 1, further comprising adjusting said present packet hysteretic peak value in response to said step of adjusting said previously determined gain factor for causing said present packet hysteretic peak value to be based upon said new gain factor.

7. The method of claim 1, further comprising:

detecting any presence of clipping from said comparison peak value; and determining a new gain factor in response to said presence of clipping by lowering said previously determined gain factor by a predetermined amount.

8. The method of claim 1, wherein said step of determining a comparison peak includes multiplying all sample values in said present packet by said previously determined gain factor.

9. A digital processor for determining gain factors for a sequential multiplicity of audio sample packets in an audio conferencing system, based upon sequentially processing each packet as a present packet, comprising:

first processing means for determining a comparison peak value for a present packet by multiplying a highest sample value from said present packet by a previously determined gain factor determined in response to a previously processed packet;

second processing means for determining a present packet hysteretic peak value from said comparison peak value and a hysteretic peak value from a previously processed packet;

third processing means for periodically comparing present packet hysteretic peak values, against predetermined range values;

fourth processing means for determining a new gain factor, to be used as the previously determined gain factor with one or more subsequently processed packets in the audio conferencing system, based upon said previously determined gain factor and in response to said third processing means for comparing; and fifth processing means for adjusting said present packet hysteretic peak value in response to said fourth processing means, for causing said present packet hysteretic peak value to be based upon said new gain factor.

10. The digital processor of claim 9, wherein said third processing means is adapted for comparing present packet hysteretic peak values against predetermined minimum and maximum range values and against a lower, silence threshold value; and further wherein said fourth processing means for determining a new gain factor includes sixth processing means for using said previously determined gain factor as said new gain factor if said hysteretic peak value is either between said predetermined minimum and maximum range values or below said lower, silence threshold value.

11. The digital processor of claim 10, further comprising seventh processing means for detecting any presence of clipping from said comparison peak value determined by said first processing means, wherein said fourth processing means for determining a new gain factor includes eighth processing means for determining said new gain factor in response to said presence of clipping by lowering said previously determined gain factor by a predetermined amount.

12. The digital processor of claim 11, wherein said second processing means for determining a present packet hysteretic peak value includes ninth processing means for adding a fraction of said comparison peak value to a complementary fraction of the hysteretic peak value determined for a previously processed packet.

13. The digital processor of claim 12, wherein said first processing means for determining a comparison peak value includes tenth processing means for multiplying all sample values in said present packet by said previously determined gain factor.

14. The digital processor of claim 13, wherein each of said processing means is stored as computer instructions in computer readable media to be executed by a computer.

15. A telephone conferencing system for processing separate sequences of audio input packets from a multiplicity of connections based upon sequentially processing each packet as a present packet, comprising;
- a first determining process for determining a comparison peak value for each packet by multiplying a highest sample value from a present packet by a previously determined, connection-specific gain factor;
- a second determining process for determining a present packet hysteretic peak value from said comparison peak value and a previously determined hysteretic peak value of a last-processed connection-specific packet;
- a comparing process for periodically comparing present packet hysteretic peak values against predetermined minimum and maximum range values and against a silence threshold value;
- a first adjusting process responsive to said comparing process, for adjusting said previously determined connection-specific gain factor to determine a new connection-specific gain factor to be used as the previously determined, connection-specific gain factor by the telephone conferencing system with one or more subsequently processed connection-specific packets, if a compared present packet hysteretic peak value is neither between said predetermined minimum and maximum range values nor below said silence threshold value; and
- a second adjusting process adapted for adjusting said present packet hysteretic peak value, in response to said first adjusting process, for causing said present packet hysteretic peak value to be based upon said new gain factor.

16. The system of claim 15, wherein said first adjusting process is adapted to use said previously determined connection-specific gain factor as said new gain factor if a compared present packet hysteretic peak value is between said predetermined minimum and maximum range values or below said silence threshold value.

17. The system of claim 16, further comprising a detecting process adapted for detecting any presence of clipping from said comparison peak value, and a third adjusting process adapted to lower said previously determined connection-specific gain factor by a predetermined amount in response to said presence of clipping, to determine said new connection-specific gain factor.

18. The system of claim 17, wherein said second determining process for determining a present packet hysteretic peak value includes an adding process adapted for adding a fraction of said comparison peak value to a complementary fraction of the hysteretic peak value determined for a previously processed, connection specific packet.

19. The system of claim 15, wherein said first determining process for determining a comparison peak value includes a multiplying process adapted for multiplying all sample values in said present packet by said previously determined gain factor.

20. The system of claim 15, wherein said comparing process is adapted to compare a present packet hysteretic peak value once every predetermined number of sequentially processed audio input packets.

* * * * *